United States Patent [19]
Royak

[11] Patent Number: 5,796,236
[45] Date of Patent: Aug. 18, 1998

[54] SLIP ADJUSTER FOR USE IN ELECTRICAL MOTOR CONTROLLERS

[75] Inventor: Semyon Royak, Solon, Ohio

[73] Assignee: Reliance Electric Industrial Company, Cleveland, Ohio

[21] Appl. No.: 885,067

[22] Filed: Jun. 30, 1997

[51] Int. Cl.⁶ .................................................. H02P 5/415
[52] U.S. Cl. ............................ 318/804; 318/801; 318/807
[58] Field of Search .............................. 318/798–801, 318/804–811

[56] References Cited

U.S. PATENT DOCUMENTS

| | | |
|---|---|---|
| 3,962,614 | 6/1976 | Rettig . |
| 4,001,660 | 1/1977 | Lipo . |
| 4,160,940 | 7/1979 | Wolf .................................. 318/803 |
| 4,484,126 | 11/1984 | Fulton et al. ...................... 318/800 |
| 4,672,288 | 6/1987 | Abbondanti ....................... 318/803 |
| 5,166,593 | 11/1992 | De Doncker et al. ............. 318/800 |
| 5,365,158 | 11/1994 | Tanaka et al. .................... 318/806 |
| 5,598,081 | 1/1997 | Okamura et al. ................. 318/801 |

*Primary Examiner*—Bentsu Ro
*Attorney, Agent, or Firm*—Michael A. Jaskolski; John M. Miller; John J. Horn

[57] ABSTRACT

A system for accurately determining a slip frequency for use in controlling an induction motor. The system includes two tables for determining ideal flux and flux current levels as a function of rotor speed and uses values from those tables to determine an actual rotor inductance required for calculating the slip. The system also generates a slip multiplier which is used to increase or decrease the slip as a function of the flux current to compensate for changing rotor resistance.

17 Claims, 5 Drawing Sheets

SLIP ADJUSTER FOR USE IN ELECTRICAL MOTOR CONTROLLERS

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

The present invention relates to systems for controlling electric induction motors and, more particularly, to a system for deriving an accurate slip estimate for use by a motor controller.

Induction Motors

All induction motors include a rotor mounted inside a stator for rotation about a rotation axis. A common rotor design includes a "squirrel cage winding" in which axial conductive bars are connected at either end by shorting rings to form a generally cylindrical structure. The stator is formed by a plurality of windings which surround the rotor and are typically arranged in three separate phases. Time varying voltage is applied across the stator windings which generate an electromotive force (emf) and an associated stator magnetic field which rotates around the stator at a stator field frequency primarily within the space defined by the rotor. As the stator field rotates about the rotor, relative motion between the stator field flux and the rotor bars induces voltages in the rotor at a slip frequency. Slip is the difference between the stator field frequency and the rotor and is commonly expressed as a fraction of the stator field frequency:

$$S = \frac{\omega_s - \omega_r}{\omega_s} \quad \text{Eq. 1}$$

where $\omega_s$ is the stator field frequency and $\omega_r$ is the rotor frequency. The voltages induced in the rotor cause rotor bar currents which in turn generate a rotor magnetic field. The stator and rotor fields are stationary with respect to each other but are separated by a changeable rotor angle $\alpha$. The two fields interact to produce torque which causes rotor rotation.

Ideally, motor speed should be controllable by simply controlling the stator field frequency. For example, because the rotor follows the stator field, by increasing stator field frequency the rotor frequency should also increase. Unfortunately, while the general rule that rotor frequency can be controlled by controlling stator field frequency is accurate, there are many non-linearities between the two frequencies which make precise control extremely complex.

In induction motors, one way to achieve better motor control by compensating for non-linearities between stator field and rotor frequencies is to control the torque between the stator and rotor fields. For example, when load increases, rotor speed can be maintained by increasing torque. Similarly, when load decreases, motor speed can be maintained by decreasing torque.

Torque is directly related to stator/rotor field interaction and therefore can be adjusted by changing the amount of field interaction. There are two basic ways to change the amount of field interaction and thereby control torque. First, the amount of field interaction can be changed by altering the relative field strengths. Generally, the attraction between two magnetic elements is greater as the magnetic force of one or both elements is increased. Thus, as the rotor and stator field strengths are increased so is attraction between the two fields which ultimately, assuming all other things being equal, gives rise to greater torque.

Second, the amount of field interaction can be changed by altering the relative positions of the stator and rotor fields. This is because, generally, the attraction between two magnetic elements increases as the two elements are brought closer together.

Thus, to facilitate an acceptable degree of motor control, in addition to controlling the stator field frequency, it is also necessary to be able to control stator and rotor field strengths and an angle $\alpha$ between the stator and rotor fields. Unfortunately the task of controlling field strengths, frequency and angle $\alpha$ is complicated by the reality that in induction motors only one operating variable, stator current, can be adjusted.

Field Oriented Control Of Induction Machines

Referring to FIG. 1, a rotating phasor 1 corresponding to the rotor flux forms angle $\alpha$ with respect to a phasor 2 corresponding to the stator current mmf. As indicated above, motor torque is proportional to the magnitudes of phasors 1 and 2 and is therefore a function of angle $\alpha$. Maximum torque and zero flux are produced when angle $\alpha$ is right (e.g., $\alpha=90°$) whereas zero torque and maximum flux are produced when phasors 1 and 2 are aligned (e.g., $\alpha=0°$). When angle $\alpha$ is between $0°$ and $90°$, a combination of torque and flux results. Phasor 1 may therefore be usefully decomposed into a flux producing component 3 perpendicular to phasor 2 and a torque producing component 4 parallel to phasor 2.

Mmf components 3 and 4 are proportional, respectively, to two stator currents $i_{qe}$, a torque producing current, and $i_{de}$, a flux producing current, which may be represented by orthogonal vectors in a rotating frame of reference (synchronous frame of reference) of the stator flux having slowly varying magnitudes. Thus, in theory stator and rotor fluxes and associated field strengths can be controlled by adjusting the division of stator currents $i_{de}$ and $i_{qe}$. In addition, by adjusting the $i_{de}/i_{qe}$ stator current division, angle $\alpha$ can be controlled to change the relative positions of phasors 1 and 2 and thereby control torque.

Accordingly, in induction motor control, in addition to controlling the stator voltage frequency (i.e. the rotational speed of phasor 2) and stator voltage amplitude, it is also advantageous to control the stator voltage phase relative to the stator winding current and hence division of stator winding current into $i_{qe}$ and $i_{de}$ components. Control strategies that attempt to independently control currents $i_{qe}$ and $i_{de}$ are generally termed field oriented control strategies ("FOC") and require knowledge about both $i_{de}$ and $i_{qe}$ magnitudes and an associated slip frequency.

Referring to FIG. 2, an induction motor equivalent circuit showing stator currents $i_{qe}$ and $i_{de}$ is illustrated where $R_s$ is a stator resistance, $L_s$ is a stator inductance, $R_r/s$ is a rotor resistance, $L_m$ is a mutual inductance $L_r$ is a rotor inductance, $\omega$ is a stator electrical frequency and $\bar{E}_r$ is the voltage drop across $R_{r/s}$. From FIG. 2, flux current $i_{de}$ can be expressed as:

$$i_{de} = \frac{\frac{L_m}{L_r} \cdot \bar{E}_r}{j\omega \frac{L_M^2}{L_r}} = \frac{\bar{E}_r}{j\omega L_M} \quad \text{Eq. 2}$$

An expression for voltage $\bar{E}_r$ can be derived by recognizing that $\bar{E}_r$ is the negative of the induced rotor voltage and that rotor voltage is related to frequency $\omega$ and rotor flux $\Psi_r$ such that:

$$\bar{E}_r = -j\omega \Psi_r \quad \text{Eq. 3}$$

Combining Equations 2 and 3 yields $$\Psi_r = I_{de} L_M \quad \text{Eq. 4}$$

Also from FIG. 2, torque current $i_{qe}$ can be expressed as:

$$i_{qe} = \frac{\frac{L_m}{L_r} \cdot \bar{E}_r}{\frac{L_M^2}{L_r^2} \cdot \frac{R_r}{s}} = -S \frac{L_r}{L_M} \cdot \frac{\bar{E}_r}{R_r} \quad \text{Eq. 5}$$

Combining Equations 3 through 5 yields:

$$i_{qe} = j \frac{L_r}{R_r} \cdot S\omega i_{de} \quad \text{Eq. 6}$$

Rearranging Equation 5 yields:

$$\omega_{slip} = S\omega = \frac{R_r}{L_r} \cdot \frac{i_{qe}}{i_{de}} \quad \text{Eq. 7}$$

Equation 7 is extremely important because it implies that for torque control in terms of currents $i_{qe}$ and $i_{de}$, there is a unique value of slip S associated with each set of current component values. Most FOCs include a slip calculator which receives currents $i_{qe}$ and $i_{de}$ and is programmed with a rotor time constant $$\frac{R_r}{L_r}$$

and determines the slip frequency $\omega_{slip}$ therefrom according to Equation 7 or some other similar equation.

Ideally, $L_r$ and $R_r$ are constants for a given motor. Most motors include name plate voltage, frequency, rated RPM and rated current which can be used to derive rotor resistance $R_{ro}$ and inductance $L_{ro}$ values which are accurate estimates of the actual motor parameters under most operating conditions. $L_{ro}$ and $R_{ro}$ can in turn be used to determine the slip frequency $\omega_{slip}$.

In reality, unfortunately, under certain operating conditions resistance $R_r$ is known to vary during motor operation. Resistance $R_r$ changes with temperature and rotor winding temperature increases as the average current through the rotor windings increases.

In addition, inductance $L_r$ changes as a function of operating characteristics. For example, up to the rated speed motor flux does not change and the relationship between flux producing current and resulting flux is linear. However, once the rated speed is exceeded, flux must be decreased and the relationship between flux and flux producing current becomes non-linear such that inductance $L_r$ increases. Erroneous resistance $R_r$ and inductance $L_r$ values result in an erroneous rotor time constant $R_r/L_r$.

The overall effect of an improper rotor time constant in a slip calculator is to incorrectly calculate angle $\alpha$. In general an incorrect $\alpha$ value causes the stator current to divide incorrectly into $i_{qe}$ and $i_{de}$ components with the result that: (1) the flux level is improperly maintained; (2) the resulting steady state torque is not equal to the demanded torque; and (3) torque response is sluggish. These errors in turn result in machine losses and a possible reduction in the peak motor torque.

Unfortunately it is extremely difficult to accurately determine instantaneous resistance $R_r$ and inductance $L_r$ values for use by a slip calculator. Some present methods to estimate resistance $R_r$ require massive amounts of CPU time in order to determine and update resistance values and the resulting values often are not sufficiently accurate for applications which require precise control.

It may also be possible to measure resistance $R_r$ directly by injecting test signals into the rotor windings and observing alterations in motor parameters. However, such signal injections would require specialized hardware and would inevitably result in motor system disturbances which are unacceptable where precise motor operation is required. Similar problems are encountered when inductance Lr is to be determined.

Thus, it would be advantageous to have a non-invasive, non-disturbing method and/or apparatus that could dynamically and accurately determine a slip value S corresponding to currents $i_{qe}$ and $i_{de}$ despite $R_r$ and $L_r$ changes during motor operation.

SUMMARY OF THE INVENTION

The present invention comprises a non-invasive system for accurately determining a slip value despite changes in rotor resistance $R_r$ and inductance $L_r$ during motor operation. As indicated above in relation to Equations 2 and 3, given flux and torque current components $i_{de}$ and $i_{qe}$, respectively, if instantaneous rotor inductance $L_r$ and resistance $R_r$ are known, an exact slip value S required for precise torque control can be determined.

While precise instantaneous inductance $L_r$ and resistance $R_r$ values cannot be directly measured, the present invention determines instantaneous inductance $L_r$ by measuring other operating parameters and iteratively derives an accurate instantaneous resistance $R_r$.

To determine instantaneous inductance $L_r$, the present invention recognizes three basic rules. First, mutual motor inductance $L_m$ and rotor inductance $L_r$ are approximately proportional. Second, mutual inductance $L_m$ for each point of operation is a function of rotor flux $\Psi_r$ and flux current $I_{de}$ according to Equation 4 which can be solved for $L_m$ as:

$$L_{mx} = \frac{\Psi_{rx}}{I_{dex}} \quad \text{Eq. 8}$$

where x identifies a specific operating point. And third, rotor flux $\Psi_r$ and the flux current $i_{de}$ are each uniquely related to motor rotor speed RPM for a given motor.

Referring to FIG. 3, a torque capability curve is illustrated wherein maximum motor torque T is plotted against rotor speed $\omega_r$. In addition to torque T, stator field current I, stator voltage V and flux $\Psi_r$ are all plotted.

The capability curve can be divided into two separate sections including speeds below a rated speed $\omega_{rate}$ and speeds thereabove. Below rated speed $\omega_{rate}$, maximum torque T is provided by maintaining a maximum rated current I and changing voltage V linearly as a function of rotor frequency or speed $\omega_r$. Because the ratio of voltage V to speed $\omega_r$ is constant during operation in this region the region is referred to as the constant V/Hz region. In the constant V/Hz region, because current I remains constant, flux $\Psi_r$ in the region of operation remains constant. This region is also referred to as a constant torque region.

Referring still to FIG. 3, at the rated speed $\omega_{rate}$, voltage V reaches a maximum rated voltage and cannot be safely increased further. Thus, to increase speed $\omega_r$ past the rated speed $\omega_{rate}$, while keeping voltage V constant, some other parameter must be changed. As well known in the motor arts:

$$\omega_r \alpha \frac{V}{\Psi_r} \qquad \text{Eq. 9}$$

Thus, speed $\omega_r$ can be further increased by reducing the flux $\Psi_r$ in inverse proportion to speed $\omega_r$ (hence operation above the rated speed is often referred to as field weaken). To reduce flux $\Psi_r$ the stator current I is reduced. Unfortunately, because of saturation and other characteristics the current I and flux $\Psi_r$ are not linearly related above rated speed $\omega_{rate}$.

Nevertheless, the flux producing current $i_{de}$ above rated speed $\omega_{rate}$ is load independent. Similarly, the flux curve above rated speed $\omega_{rate}$ is load independent. For the present invention look-up tables are generated during a commissioning period which provide current and flux as a function of speed at no load which can be used during motor operation to derive actual rotor inductance $L_r$. In addition, a name plate mutual inductance $L_{mo}$ (provided by manufacturer or calculated based on name plate data) is also required.

In this light, flux $\Psi_r$ and the flux current $i_{de}$ are determined for a rotor frequency $\omega_r$. Then flux $\Psi_r$ and current $i_{de}$ are plugged into Equation 8 to generate an actual mutual inductance $L_m$. Next, a mutual inductance gain is determined by dividing actual mutual inductance $L_m$ by nameplate mutual inductance $L_{mo}$. Because inductances $L_m$ and $L_r$ are proportional the actual instantaneous rotor inductance $L_r$ can be determined by multiplying the gain $L_m/L_{mo}$ by the name plate rotor inductance $L_{ro}$.

To derive an instantaneous resistant $R_r$ the invention recognizes three basic rules. First, if inductance error has already been compensated, slip frequency only depends on rotor resistance. Second, there is an ideal flux current $i_{de}$ for each rotor frequency $\omega_r$ of a given motor. And third, when a reference flux current is not equal to the ideal flux current for a given motor frequency, the instantaneous rotor resistance value is inaccurate. Specifically, when the rotor resistance estimate $R_r$ is too small, the reference flux current is less than the ideal flux current and when the rotor resistance estimate $R_r$ is too large, the reference flux current is greater than the ideal flux current. This also can be appreciated by observing FIG. 2 wherein, if the rotor resistance $R_r$ is reduced, flux current $i_{de}$ is also reduced and if $R_r$ is increased $i_{de}$ is increased.

Thus, to derive an accurate rotor resistance $R_r$, the present invention increases the rotor resistance $R_r$ value when the reference flux current is less than ideal and decreases $R_r$ when the reference flux current is greater than ideal. Resistance $R_r$ changes are stepwise iterative so that an accurate value is not overshot resulting in oscillatory $R_r$ values.

Once accurate resistance $R_r$ and inductance $L_r$ have been determined, both values are provided to a slip determiner. The slip determiner also receives the reference flux and torque currents $i_{de}$ and $i_{qe}$, respectively, and uses all received signals to generate an accurate slip value.

Thus, one object of the present invention is to provide a simple method and apparatus whereby the difference between an actual rotor resistance and an estimated rotor resistance can be reduced. Another object is to provide a simple method and apparatus whereby an actual rotor inductance can be determined during motor operation. Still another object is to provide an accurate rotor time constant. A further object is to provide an accurate slip value for use in motor controls. One other object is to achieve the objects identified above inexpensively and with little specialized hardware.

Other and further aspects and objects of the present invention become apparent during the course of the following description and by reference to the accompanying drawings.

DESCRIPTION OF THE PREFERRED EMBODIMENT

In the description that follows, an "*" denotes a "command" signal, an "e" subscript denotes that a signal is referred to the synchronous reference frame, an "s" subscript denotes that a signal is referred to the stationary frame of reference, an "fb" subscript denotes that a signal is a feedback signal, an "r" subscript denotes a reference signal or a rotor value, depending on the context.

Figure 4:
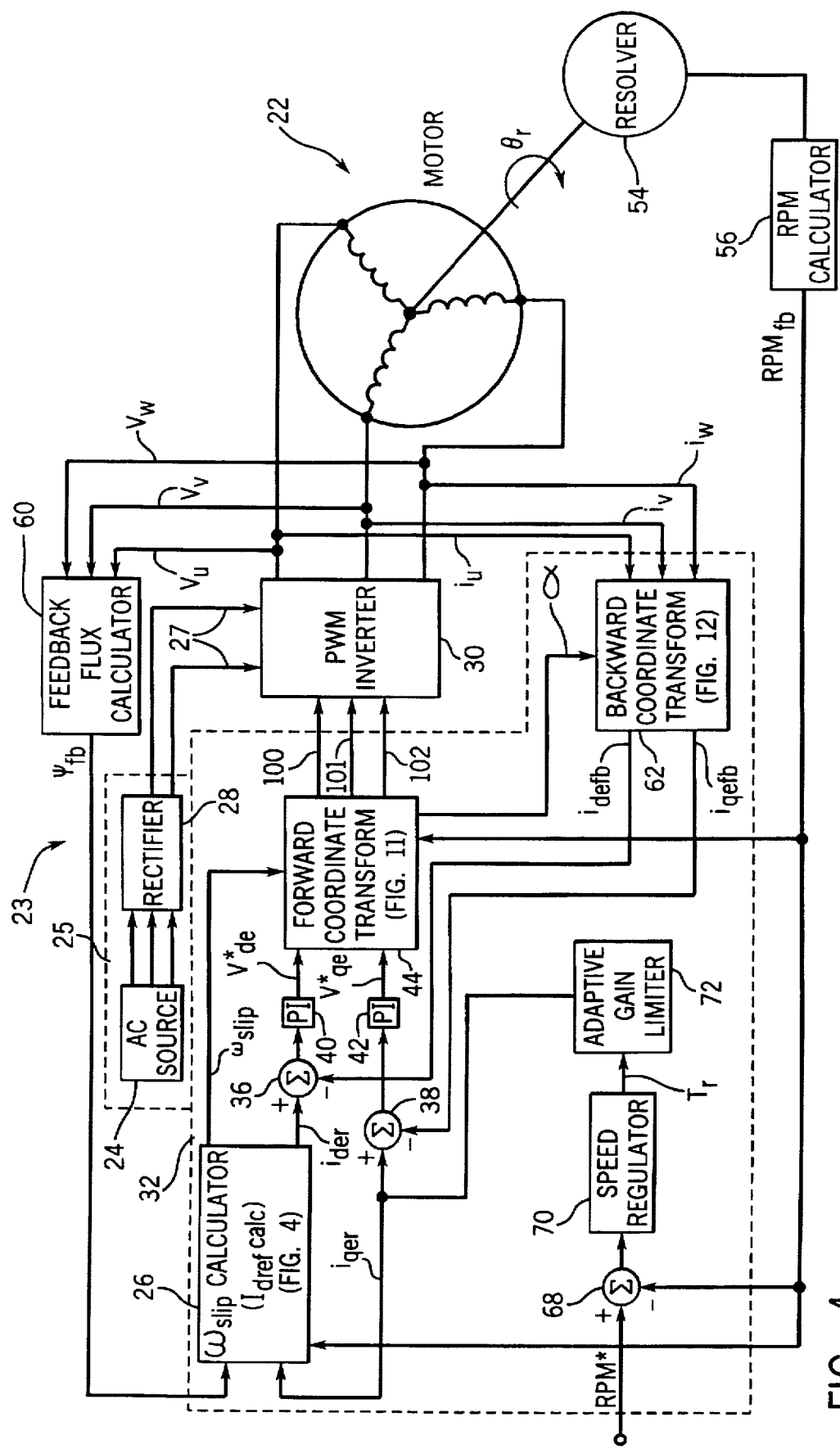
FIG. 4 is a schematic of a motor control system according to the present invention.

Referring now to FIG. 4, the present invention will be described in the context of a motor drive 23 that receives a command speed signal RPM* and produces voltages $V_u$, $V_v$ and $V_w$ to drive a motor 22 at the command speed RPM*. Drive 23 includes a power section 25, a controller 32, a pulse width modulating (PWM) inverter 30 and three feedback loops which provide a flux feedback $\Psi_{fb}$, d and q-axes current feedbacks $i_{defb}$, $i_{qefb}$, respectively, and a rotor speed feedback RPM$_{fb}$ which are described in more detail below.

The power section 25 receives power at a line frequency of 60 Hz from a three phase AC power source 24. The three phases of the power source are connected to an AC/DC power rectifier 28 which rectifies the alternating current signals from the AC source 24, to produce a DC voltage on a DC bus 27 that connects to power inputs on invertor 30, which completes the power section of the drive. The AC source 24, the AC/DC power rectifier 28, and DC bus 27 provide a DC source for generating a DC voltage of constant magnitude.

Invertor 30 includes a group of switching elements which are turned on and off to convert DC voltage to pulses of constant magnitude. The invertor pulse train is characterized by a first set of positive going pulses of constant magnitude but of varying pulse width followed by a second set of negative going pulses of constant magnitude and of varying pulse width. The RMS value of this pulse train pattern approximates one cycle of a sinusoidal AC waveform. The pattern is repeated to generate additional cycles of the AC waveform. To control the frequency and magnitude of the resultant AC power signals to the motor, AC invertor control signals are applied to invertor 30.

Control signals to drive the PWM invertor are provided by controller 32. Controller 32 receives command speed signal RPM* and all of the feedback signals and generates suitable control signals which are provided to inverter 30 via lines 100, 101 and 102.

There are three main loops which provide information to controller 32 for use in determining how the control signals should be altered to drive the motor 22 at command speed $\omega^*_r$. The first is a feedback loop that supplies a flux feedback signal $\Psi_{fb}$. The second loop is a current feedback loop. The third loop is either a feedback or observer loop that provides position information with respect to the motor rotor.

In the first loop, stator voltages $V_u$, $V_v$ and $V_w$ across the stator windings are sensed using voltage sensing devices (not shown) of a type known in the art. Signals $V_u$, $V_v$ and $V_w$ are fed to a feedback flux calculator 60 which determines the rotor flux $\Psi_{fb}$ in a manner well known in the art.

Figure 12:
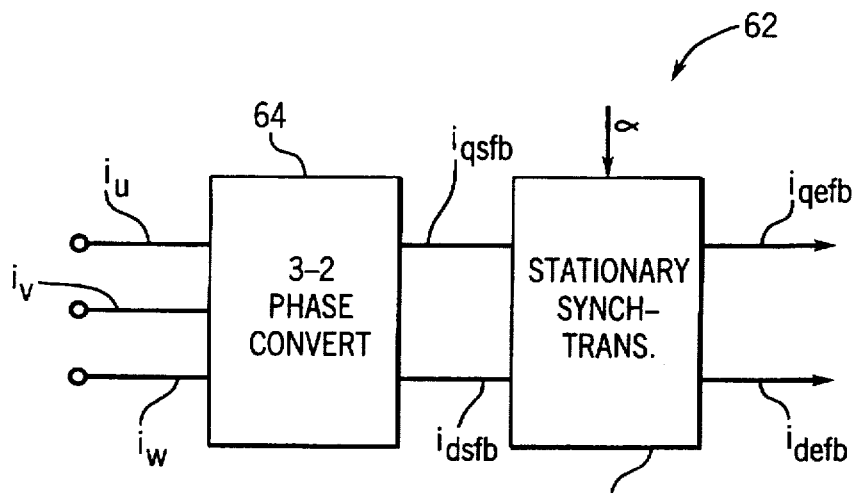
FIG. 12 is a block diagram of the backward coordinate transformer of FIG. 4.

In the second feedback loop, three phase stator currents $i_u$, $i_v$ and $i_w$ are sensed using a hall effect sensor or some other similar device. The currents $i_u$, $i_v$ and $i_w$ are fed to a backward coordinate transformer 62. Transformer 62 is shown in detail in FIG. 12 and includes a 3-2 phase converter 64 and a stationary to synchronous transformer 66. The 3-2 phase converter 64 converts the three phase currents $i_u$, $i_v$ and $i_w$ into two phase stationary d and q-axis feedback currents $i_{qsfb}$ and $i_{dsfb}$ according to the following Equation:

$$\begin{bmatrix} i_{qsfb} \\ i_{dsfb} \end{bmatrix} = \frac{3}{2} \begin{bmatrix} 1 & 0 & 0 \\ \frac{1}{\sqrt{3}} & 0 & \frac{2}{\sqrt{3}} \end{bmatrix} \begin{bmatrix} i_u \\ i_v \\ i_w \end{bmatrix} \quad \text{Eq. 10}$$

Next, the two stationary d and q-axis currents $i_{qsfb}$, $i_{dsfb}$ are provided to transformer 66 which also receives rotor angle $\alpha$ which is calculated in a manner described below. The transformer 66 transforms stationary currents $i_{qsfb}$ and $i_{dsfb}$ to a synchronous frame of reference generating synchronous feedback current signals $i_{qefb}$ and $i_{defb}$ according to the following Equation:

$$\begin{bmatrix} i_{qefb} \\ i_{defb} \end{bmatrix} = \begin{bmatrix} \cos\alpha & \sin\alpha \\ -\sin\alpha & \cos\alpha \end{bmatrix} \begin{bmatrix} i_{qsfb} \\ i_{dsfb} \end{bmatrix} \quad \text{Eq. 11}$$

The third control loop may include a position detector or a position observer. The position detector may be a resolver 54 that is coupled to the motor 22. Resolver 54 estimates the position through techniques known in the art and generates a rotor position signal $\theta_r$. The rotor position signal $\theta_r$ is provided to a rotor speed calculator 56 which produces the rotor speed feedback signal $RPM_{fb}$.

Referring again to FIG. 4, controller 32 includes a slip frequency calculator 26, a speed regulator 70, a gain limiter 72, three summers 36, 38 and 68, two propositional-integral controllers 40, 42 and a transformer 44.

Figure 5:
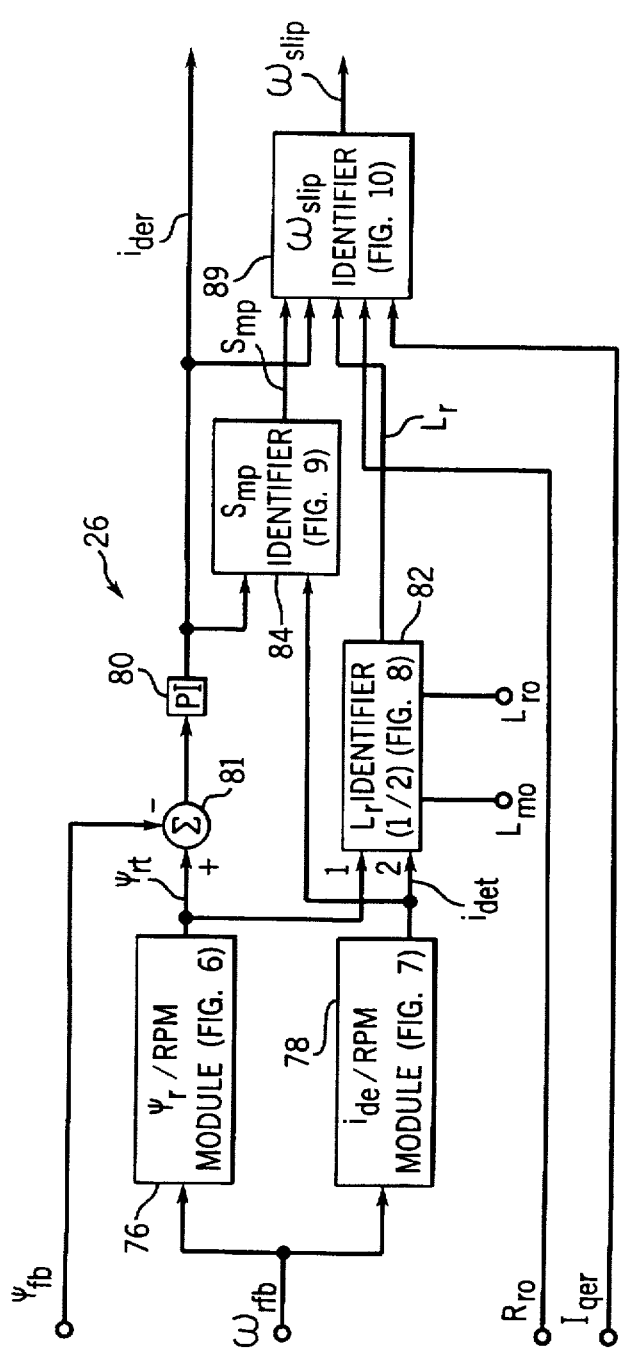
FIG. 5 is a detailed block diagram showing components of this slip calculator illustrated in FIG. 4.
Figure 6:
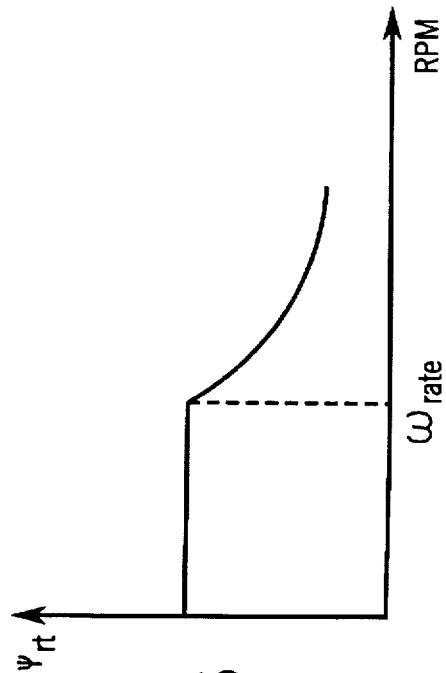
FIG. 6 is a graph plotting flux as a function of rotor speed.

Referring also to FIG. 5, the slip frequency calculator 26 includes a $\Psi_r/RPM$ module 76, an $i_{de}/RPM$ module 78, a PI controller 80, a rotor inductance identifier 82, a slip multiplier identifier 84 and a slip frequency identifier 89. Referring also to FIG. 6, the $\Psi_r/RPM$ module 76 includes a memory (not shown) which can be accessed by module 76 to determine what the motor flux should be at a given rotor speed RPM.

FIG. 6 illustrates a typical $\Psi_r/RPM$ relationship wherein the flux is constant up to a rated speed $\omega_{rate}$ and is inversely related to rotor frequency $\omega_r$ thereabove. It is contemplated that data required to provide a curve like the one in FIG. 6 for a specific motor will be generated during a commissioning period wherein the motor is driven with no load. During such a commissioning period the rotor speed is increased and flux is measure at different rotor speeds. In the alternative, the flux above rated speed $\omega_{rate}$ can be generated by simply recognizing that flux $\Psi$ and speed $\omega$ are inversely proportional when stator voltage V is held constant (see Eq. 9).

Figure 7:
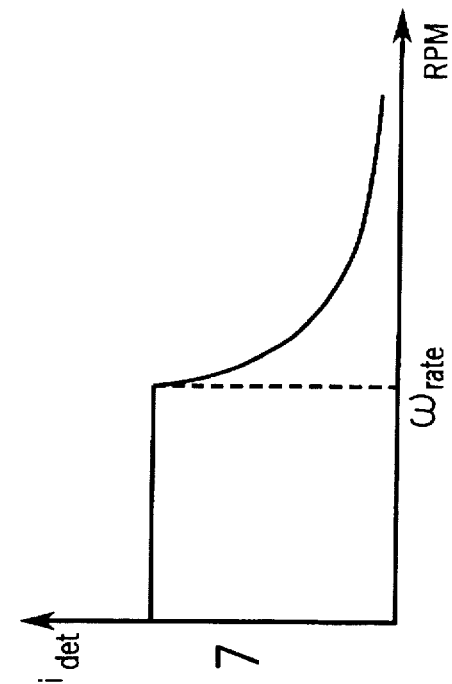
FIG. 7 is a graph plotting flux current as a function of rotor speed.

Similarly, referring to FIG. 7, it is contemplated that an $i_{de}/RPM$ curve for a specific motor is generated during a commissioning period wherein transformer 62 (FIG. 4) is used to provide current values $i_{de}$ for different motor speeds.

Note that the curve in FIG. 7 indicates that current $i_{de}$ is not inversely related to speed $\omega_r$. The $i_{de}/\omega_r$ relationship is dependent on a large number of parameters including specific motor configuration and will vary from motor to motor. Thus, a unique curve like that in FIG. 7 should be developed for each specific motor. Once curves like those in FIGS. 6 and 7 have been generated for a specific motor, modules 76 and 78 are programmed with the generated data. Then, during motor operation, with feedback speed $RPM_{fb}$ provided to each module 76 and 78, module 76 identifies an ideal flux $\Psi_{rt}$ while module 78 identifies an ideal d-axis current $i_{det}$. The flux value $\Psi_{rt}$ is provided to summer 81 along with feedback flux $\Psi_{fb}$. Feedback flux $\Psi_{fb}$ is subtracted from flux $\Psi_{rt}$ and the difference is provided to controller 80 which generates a d-axis reference current $i_{der}$.

Figure 1:
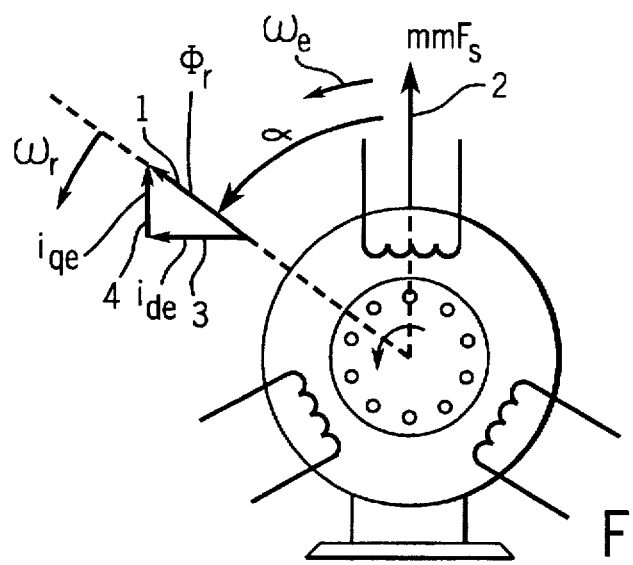
FIG. 1 is a schematic view and cross section of an induction motor showing instantaneous locations of rotor flux, stator mmf, and the torque and flux components of the mmf.
Figure 2:
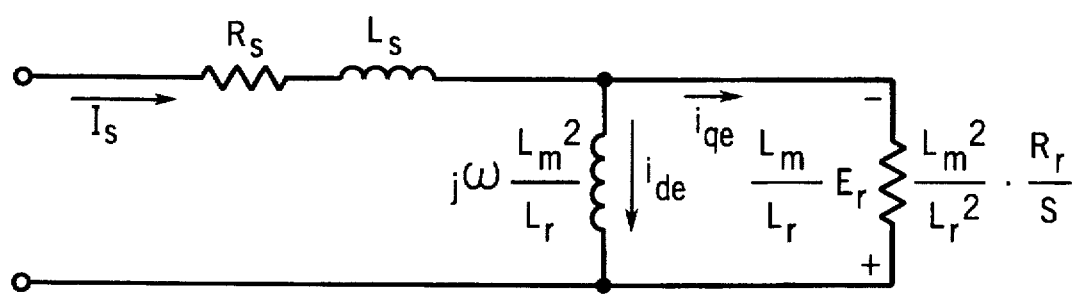
FIG. 2 is an equivalent circuit for an induction motor.
Figure 3:
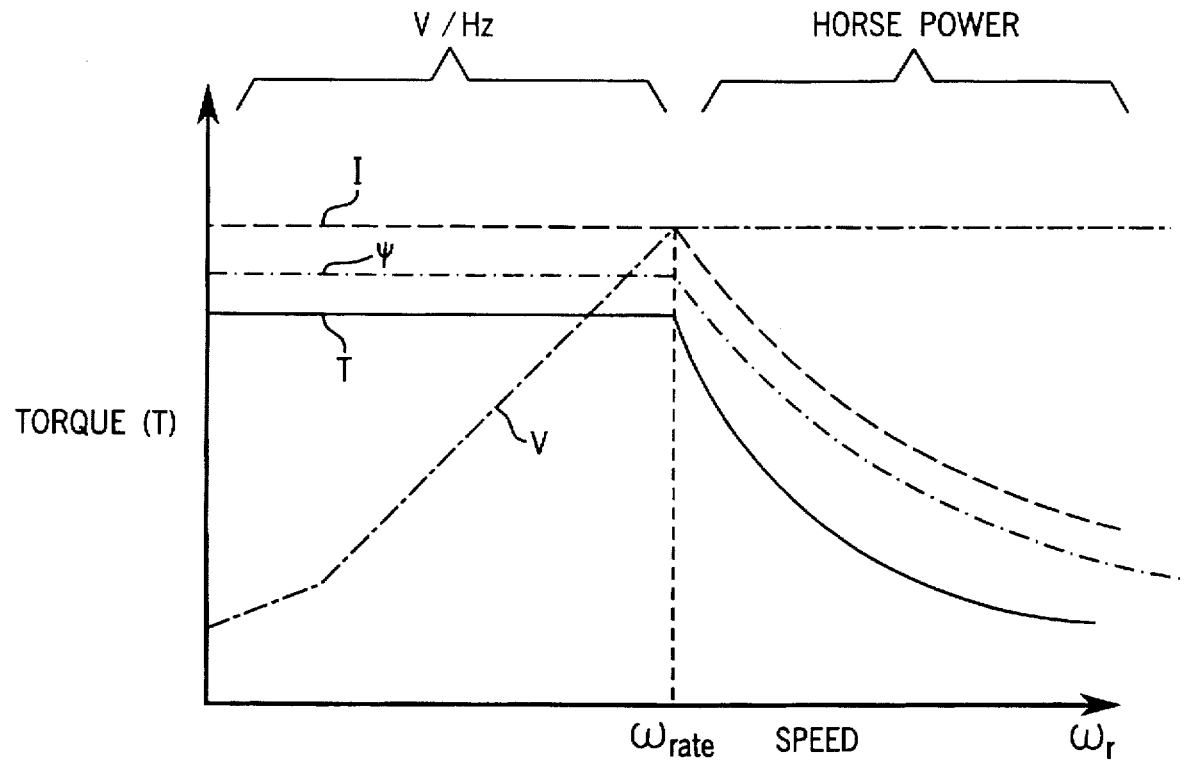
FIG. 3 is a typical AC induction motor torque capability curve.
Figure 8:
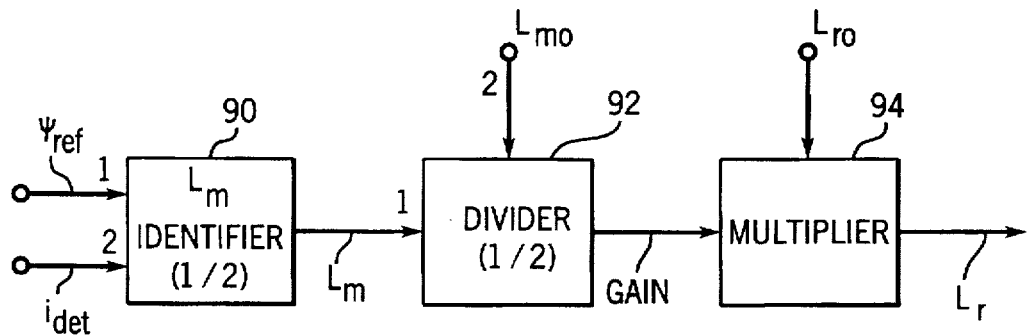
FIG. 8 is a block diagram of the inductance identifier of FIG. 5.

Referring also to FIG. 8, ideal current $i_{det}$ and flux signal $\Psi_{rt}$ are provided to identifier 82. Identifier 82 includes a mutual inductance identifier 90, a divider 92 and a multiplier 94. Identifier 90 receives flux signal $\Psi_{rt}$ and ideal current $i_{det}$ and divides the flux by the current according to Equation 8 to provide the actual mutual inductance $L_m$. Next, divider 92 divides inductance $L_m$ by the name plate mutual inductance $L_{mo}$ and provides a gain. Because the rotor inductance and mutual inductance are proportional, the mutual inductance gain reflects rotor inductance gain. Multiplier 94 multiplies the gain by the name plate rotor inductance $L_{ro}$ producing the actual rotor inductance $L_r$.

Figure 9:
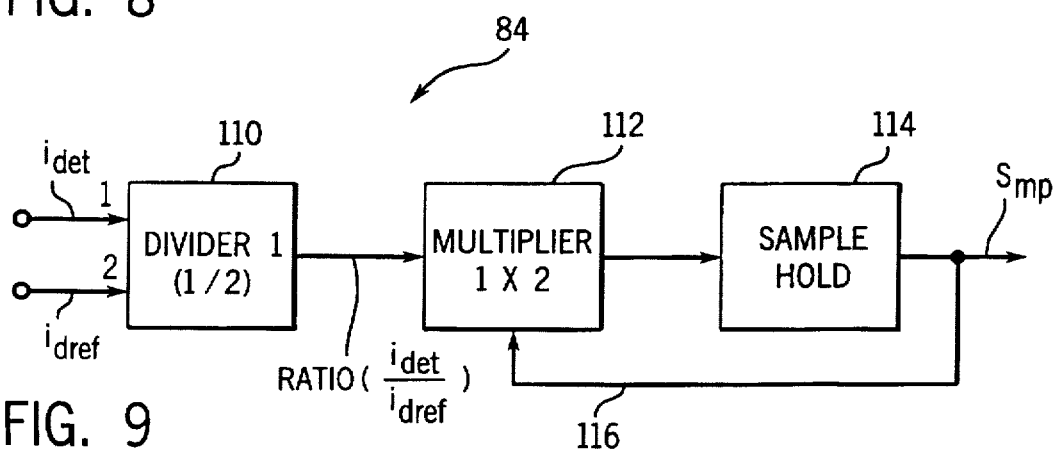
FIG. 9 is a detailed block diagram of the slip multiplier identifier of FIG. 5.

Referring again to FIG. 5, the d-axis reference current $i_{der}$ and ideal d-axis current $i_{det}$ are both provided to slip multiplier identifier 84 which is illustrated in detail in FIG. 9. Identifier 84 includes a single divider 110, a single multiplier 112 and a sample and hold circuit 114. Divider 110 divides ideal current $i_{det}$ by reference current $i_{der}$ and provides the ratio to multiplier 112. The output of 112 is provided to sample and hold circuit 114 which outputs an instantaneous slip multiplier $S_{mp}$. A feedback loop 116 provides the output value of the sample and hold circuit 114 to multiplier 112. Thus, multiplier 112 multiplies the ratio $i_{det}/i_{der}$ by the instantaneous slip multiplier $S_{mp}$.

Figure 10:
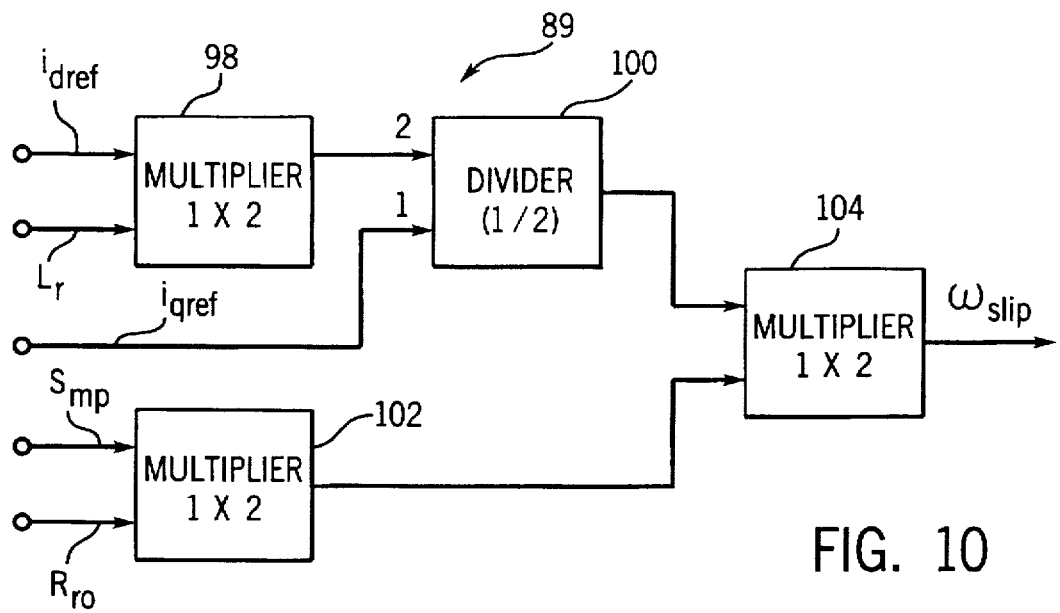
FIG. 10 is a detailed block diagram of the slip identified illustrated in FIG. 5.

Referring again to FIG. 5, the output of identifier 84 is provided to the slip frequency identifier 89 along with the d and q-axis reference currents $i_{der}$, $i_{qer}$, the name plate rotor resistance $R_{ro}$ and the actual rotor inductance value $L_r$. Identifier 89 is illustrated in detail in FIG. 10 which implements the following equation:

$$\omega_{slip} = \frac{R_{ro}}{L_r} \cdot \frac{i_{qref}}{i_{dref}} \cdot S_{mp} \quad \text{Eq. 12}$$

To this end, identifier 89 includes 3 multipliers 98, 102 and 104 and a single divider 100. Multiplier 98 multiplies reference current $i_{der}$ and the rotor inductance value $L_r$ and provides the result to divider 100. Divider 100 divides reference current $i_{qer}$ by the output of multiplier 98 and provides an output to multiplier 104. Multiplier 102 multiplies the slip multiplier by the name plate rotor resistance value $R_{ro}$ and provides its output to multiplier 104. Multiplier 104 multiplies the outputs from divider 100 and multiplier 102 and provides an accurate slip frequency $\omega_{slip}$.

The reference flux and torque currents $i_{der}$, $i_{qer}$, respectively, and slip frequency $\omega_{slip}$ represent the desired flux and torque current values and associated slip frequency which will result in the command rotor speed RPM*. To cause the actual flux and torque currents to approach the reference values $i_{der}$ and $i_{qer}$, feedback flux and torque current signals $i_{defb}$ and $i_{qefb}$ are subtracted from reference values $i_{der}$ and $i_{qer}$ at summers 36 and 38, respectively, and the differences are provided to PI controllers 40, 42. Controller 40 steps up the difference between reference signal $i_{der}$ and feedback signal $i_{defb}$ to provide a synchronous flux voltage command signal $V^*_{de}$. Similarly, controller 42 steps up the difference between reference signal $i_{qer}$ and feedback signal $i_{qefb}$ to provide a synchronous torque voltage command signal $V^*_{qe}$.

Figure 11:
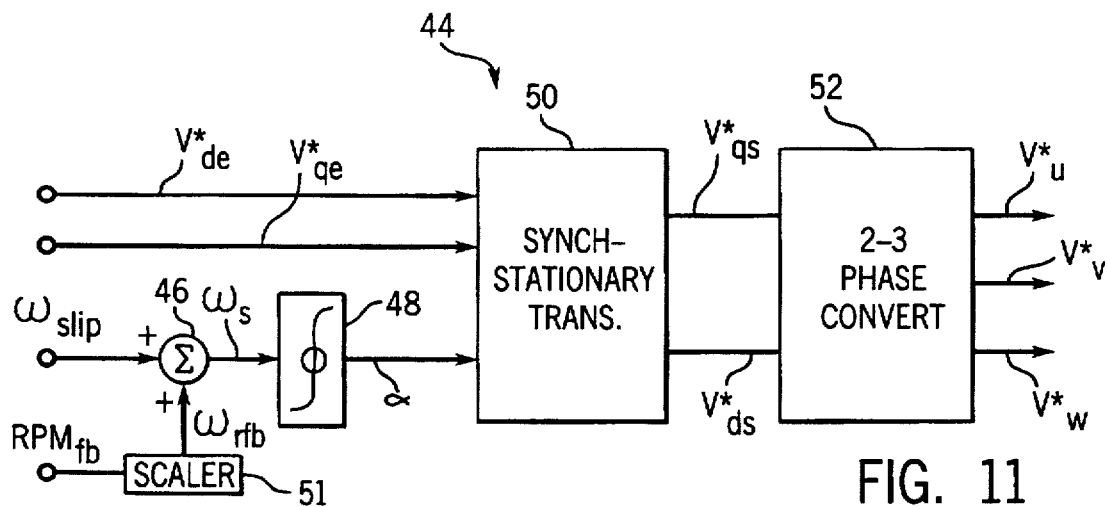
FIG. 11 is a block diagram of the forward coordinate transformer of FIG. 4.

Because the invertor 30 responds to stationary, three phase voltage signals, the d and q-axis command voltages $V_{de}^*$ and $V_{qe}^*$ must be converted accordingly. To this end, the d and q-axis voltages $V_{de}^*$ and $V_{qe}^*$ are provided to a forward coordinate transformer 44 which is illustrated in FIG. 11.

Transformer 44 includes a summer 46, an integrator 48, a synchronous to stationary transformer 50, a 2-to-3 phase converter 52 and a scaler 51. Scaler 51 receives speed feedback signal $RPM_{fb}$ and determines the rotor frequency feedback $\omega_{rfb}$ which is provided to summer 46. Summer 46 receives both slip frequency signal $\omega_{slip}$ and the rotor frequency feedback signal $\omega_{rfb}$ and adds those two signals to provide a stator frequency signal $\omega_s$. The stator frequency signal $\omega_s$ is provided to the integrator 48 which determines the rotor angle $\alpha$. Angle $\alpha$ is provided to the synchronous to stationary transformer 50. Transformer 50 also receives the synchronous command voltage signals $V_{de}^*$ and $V_{qe}^*$. Transformer 50 transforms the voltage signals into the stationary reference frame according to the following matrix equation:

$$\begin{bmatrix} V_{qs}^* \\ V_{ds}^* \end{bmatrix} = \begin{bmatrix} \cos\alpha & -\sin\alpha \\ \sin\alpha & \cos\alpha \end{bmatrix} \begin{bmatrix} V_{qe}^* \\ V_{de}^* \end{bmatrix} \quad \text{Eq. 13}$$

Stationary command voltage signals $V_{ds}^*$ and $V_{qs}^*$ are provided to converter 52. Converter 52 converts the d and q axis voltage command signals $V_{ds}^*$ and $V_{qs}^*$ into three phase balanced voltage command signals $V_u^*$, $V_v^*$ and $V_w^*$ to drive the PWM converter 30. The 2 to 3 phase conversion is performed according to the following matrix equation:

$$\begin{bmatrix} V_u^* \\ V_v^* \\ V_w^* \end{bmatrix} = \frac{2}{3} \begin{bmatrix} 1 & 0 \\ -\frac{1}{2} & -\frac{\sqrt{3}}{2} \\ -\frac{1}{2} & -\frac{\sqrt{3}}{2} \end{bmatrix} \begin{bmatrix} V_{qs}^* \\ V_{ds}^* \end{bmatrix} \quad \text{Eq. 14}$$

Referring to FIG. 4, invertor 30 receives signals $V_u^*$, $V_v^*$ and $V_w^*$ and the magnitude and the frequency of these signals determines the pulse widths and the number of pulses in the pulse trains which are applied to the terminals of the motor. Voltages $V_u$, $V_v$, and $V_w$ are phase voltage signals incorporated in the line of line voltage observed across the standard terminals.

Although the present invention has been described above in the context of an apparatus, it should be understood that the present invention also contemplates a method to be used in the motor controller for determining an accurate slip frequency. Preferably, the method is for determining a slip value to be used with a field oriented motor control system like the one described above. The system should be capable of altering motor operation in response to a current command vector having $i_{qe}$ and $i_{de}$ current components, the system including a speed calculator providing a motor rotor speed signal and provided with a name plate rotor resistance value. The method should include the steps of receiving the speed limit signal and determining the ideal reference flux current therefrom, receiving the speed signal and determining an ideal or reference rotor flux therefrom, mathematically combining the flux current and the rotor flux to determine an actual rotor inductance, mathematically combining the $i_{de}$ current component and the flux current to generate an update slip multiplier, and mathematically combining the name plate resistance value, slip multiplier, actual rotor inductance and $i_{de}$ and $i_{qe}$ components to provide the slip.

Also, preferably, the controller includes a look-up table generated during a commissioning period wherein flux current values were measured as a function of motor speed while the motor was driven at various speeds and the step of determining an ideal flux current includes the step of correlating the speed signal with a flux current in the table. In addition, preferably, the controller also includes a look-up table generated during a commissioning period wherein flux values were measured as a function of motor speed and while the motor was driven as various speeds and the step of determining the ideal rotor flux includes the step of correlating the speed signal with a flux in the table.

It should be noted that the methods and apparatus as described above are only exemplary and do not limit the scope of the invention, and that various modifications could be made by those skilled in the art that may fall under the scope of the invention. For example, while the flux and current modules of FIG. 5 are described as incorporating memories that include the look-up tables illustrated in FIGS. 6 and 7, clearly each of the modules could include some other type of data storage mechanism whereby the information illustrated in FIGS. 6 and 7 could be stored. In addition, while the invention is described in context of a controller 32 that includes many different components, clearly, the invention could be, and in a preferred embodiment is meant to be, implemented using a microprocessor which can perform all of the calculations indicated and described above.

In order to reprise the public of the various embodiments that may fall within the scope of the invention, the following claims are made:

I claim:

1. A slip frequency calculator for determining a slip frequency to be used with a field oriented motor control system, the control system altering motor operation in response to a current command vector having $i_{qe}$ and $i_{de}$ current components, the system including a speed calculator providing a motor rotor speed signal and provided with a name plate rotor resistance value, the slip calculator comprising:

(a) a flux current determiner receiving the speed signal and determining an ideal flux current;

(b) a flux determiner receiving the speed signal and determining an ideal rotor flux;

(c) an inductance calculator for mathematically combining the flux current and rotor flux to determine an actual rotor inductance;

(d) a multiplier calculator for mathematically combining the $i_{de}$ current component and the flux current to generate an updated slip multiplier; and (e) a slip frequency determiner mathematically combining the name plate resistance value, slip multiplier, actual rotor inductance and $i_{qe}$ and $i_{de}$ current components to provide the slip frequency.

2. The calculator of claim 1 wherein the flux current determiner includes a look-up table which correlates ideal flux current values and motor speed at various motor speeds.

3. The calculator of claim 2, wherein the table corresponds to flux current data generated for the motor while the motor is driven with no load.

4. The calculator of claim 1 wherein the flux determiner includes a look-up table which correlates ideal flux values and motor speed at various motor speeds.

5. The calculator of claim 4 wherein the table corresponds to flux data generated for the motor while the motor is driven with no load.

6. The calculator of claim 1 wherein the inductance calculator mathematically combines by dividing the flux by the flux current.

7. The calculator of claim 1 wherein the multiplier calculator includes a divider, a multiplier and a sample/hold mechanism which holds an immediate slip multiplier, and to mathematically combine the $i_{de}$ current component and the flux currents the divider divides the flux current by the $i_{de}$ current producing a current ratio and the multiplier multiplies the current ratio by the immediate slip multiplier to generate the updated slip multiplier.

8. The calculator of claim 1 wherein the slip frequency determiner mathematically combines according to the following equation:

$$\omega_{slip} = \frac{R_{ro}}{L_r} \cdot \frac{i_{de}}{i_{qe}} \cdot S_{mp}$$

where $L_r$ is the actual rotor inductance, $i_{de}$ is the flux current, $i_{qe}$ is the torque current, $R_{ro}$ is the name plate rotor resistance, and $S_{mp}$ is the updated slip multiplier.

9. A method for determining a slip frequency to be use with a field oriented motor control system, the control system altering motor operation in response to a current command vector having $i_{qe}$ and $i_{de}$ current components, the system including a speed calculator providing a motor rotor speed signal and provided with a name plate rotor resistance value, the method comprising the steps of:

(a) receiving the speed signal and determining an ideal flux current therefrom;

(b) receiving the speed signal and determining an ideal rotor flux therefrom;

(c) mathematically combining the flux current and rotor flux to determine an actual rotor inductance;

(d) mathematically combining the $i_{de}$ current component and the flux current to generate an updated slip multiplier; and (e) mathematically combining the name plate resistance value, slip multiplier, actual rotor inductance and $i_{qe}$ and $i_{de}$ current components to provide the slip frequency.

10. The method of claim 9 wherein the control system includes a look-up table which correlates flux current values and motor speed at various speeds and the step of determining an ideal flux current includes the step of correlating the speed signal with a flux current in the table.

11. The method of claim 10 wherein the table corresponds to current data generated for the motor while the motor is driven with no load is generated while no load is attached to the motor.

12. The method of claim 9 wherein the control system includes a look-up table flux with motor speed for various speeds and the step of determining the ideal rotor flux includes the step of correlating the speed signal with a flux in the table.

13. The method of claim 12 wherein the table corresponds to flux data generated for the motor while the motor is driven with no load.

14. The method of claim 9 wherein the step of mathematically combining the flux current and rotor flux to determine an actual rotor inductance includes the step of dividing the flux by the flux current.

15. The method of claim 9 wherein the step of mathematically combining the $i_{de}$ current component and the flux current to generate an updated slip multiplier includes the step of dividing the flux current by the $i_{de}$ current component producing a current ratio and multiplying the current ratio by an immediate slip multiplier to generate the updated slip multiplier.

16. The method of claim 9 wherein the step of mathematically combining to provide the slip frequency includes the step of solving the following equation:

$$\omega_{slip} = \frac{R_{ro}}{L_r} \cdot \frac{i_{de}}{i_{qe}} \cdot S_{mp}$$

where $L_r$ is the actual rotor inductance, $i_{de}$ is the flux current, $i_{qe}$ is the torque current, $R_{ro}$ is the name plate rotor resistance, and $S_{mp}$ is the updated slip multiplier.

17. A slip calculator for determining a slip value to be used with a field oriented motor control system, the control system altering motor operation in response to a current command vector having $i_{qe}$ and $i_{de}$ current components, the system including a speed calculator providing a motor rotor speed signal and provided with a name plate rotor resistance value, the slip calculator comprising:

(a) a flux current determiner including a current table which correlates speed and flux current under no load motor operating conditions, the flux current determiner receiving the speed signal and correlating the speed signal with a flux current in the table to provide an ideal flux current;

(b) a flux determiner including a flux table which correlates speed and flux under no load motor operating conditions, the flux determiner receiving the speed signal and correlating the speed signal with a flux in the flux table to provide an ideal rotor flux;

(c) an inductance calculator which divides the ideal flux by the ideal flux current to generate an actual rotor inductance;

(d) a multiplier calculator which divides the flux current by the $i_{de}$ current component to generate a current ratio and then multiplies the current ratio by an immediate slip multiplier to generate an updated slip multiplier; and (e) a slip determiner which mathematically combining the name plate resistance value, updated slip multiplier, actual rotor inductance and $i_{qe}$ and $i_{de}$ current components to provide the slip according to the following equation:

$$\omega_{slip} = \frac{R_{ro}}{L_r} \cdot \frac{i_{de}}{i_{qe}} \cdot S_{mp}$$

where $L_r$ is the actual rotor inductance, $R_{ro}$ is the name plate rotor resistance, and $S_{mp}$ is the updated slip multiplier.

* * * * *